United States Patent [19]

Kaufmann et al.

[11] 4,456,355

[45] Jun. 26, 1984

[54] CONTROL APPARATUS FOR FILM DISC PROCESSOR

[75] Inventors: Kenneth M. Kaufmann; Robert W. Lundstrom; Robert E. Beer, all of Minneapolis, Minn.

[73] Assignee: Pako Corporation, Minneapolis, Minn.

[21] Appl. No.: 432,859

[22] Filed: Oct. 5, 1982

[51] Int. Cl.$^3$ ............................ G03B 3/06; G03B 3/08

[52] U.S. Cl. ...................................... 354/299; 354/322; 354/324; 354/330

[58] Field of Search ............... 354/319, 320, 321, 322, 354/324, 329, 330, 299

[56] References Cited

U.S. PATENT DOCUMENTS

| | | | |
|---|---|---|---|
| 3,623,416 | 11/1971 | Anderberg | 354/330 |
| 3,672,289 | 6/1972 | Kelso | 354/322 |
| 4,112,452 | 9/1978 | Patton | 354/322 |
| 4,112,453 | 9/1978 | Hutchinson | 354/330 |
| 4,112,454 | 9/1978 | Harvey | 354/330 |
| 4,128,326 | 12/1978 | Selak | 354/324 |
| 4,167,320 | 9/1979 | Hutchinson | 354/323 |
| 4,178,091 | 12/1979 | Solomon | 354/322 |
| 4,188,106 | 2/1980 | Harvey | 354/330 |
| 4,194,822 | 3/1980 | Sethi | 354/121 |
| 4,252,430 | 2/1981 | Michal | 354/322 |

OTHER PUBLICATIONS

172 *Research Disclosure,* Aug. 1978: No. 17258—Horizontal In-Line Photofinishing Processor.
172 *Research Disclosure,* Aug. 1978: No. 17262—Method and Apparatus for Treating Elements of Photographic Film.
172 *Research Disclosure,* Aug. 1978: No. 17263—Improved Horizontal Film-Processing Apparatus.
172 *Research Disclosure,* Aug. 1978: No. 17264—Improved Vertical Film-Processing Apparatus.
172 *Research Disclosure,* Aug. 1978: No. 17265—Rotary Film-Processing Apparatus.
172 *Research Disclosure,* Oct. 1978: No. 17429—Processor Concept.
Brochure—Eastman Kodak Company of Rochester, New York, "Kodak Disc Film Processor, Model 200".
Brochure—Eastman Kodak Company of Rochester, New York, "Kodak Disc Film Processor, Model 1000".

*Primary Examiner*—A. A. Mathews
*Attorney, Agent, or Firm*—Kinney, Lange, Braddock, Westman & Fairbairn

[57] ABSTRACT

A processor for processing undeveloped photographic film discs mounted on a spindle assembly has a conveyor to intermittently convey the spindle assembly from a first end to a second end of the processor along a generally horizontal conveyor path. The spindle assembly is conveyed to a plurality of processing stations along the conveyor path, with each processing station having a processing tank. During processing, the processing tanks move between an upward process position and a downward dump and transport position. A fluid dispenser at each processing station dispenses processing fluid to the processing tank at that processing station when a spindle assembly is positioned at that processing station. A spindle sensor at the first end of the processor provides a signal indicative of the presence of the spindle assembly in the processor. The operations of the conveyor, processing tank movement and fluid dispensers are controlled by a control apparatus as a function of the spindle sensor signal.

12 Claims, 10 Drawing Figures

2
8
20
22
24
26
28
31
42
44
46
47
48
52
56
60a
60b
60c
60d
60e
60f
60g
60h
60i
60j
62
70a
70b
70c
70d
70e
70f
70g
70h
70i
70j
70K
74
75
76
77
78
80
82
84
88
92
93
120
121
122
124
126
145
146
150
151
152
153
154
155
156
157
158
159
160
161
240
242
244
246
250
260
272
276
280
314

CONTROL APPARATUS FOR FILM DISC PROCESSOR

REFERENCE TO CO-PENDING APPLICATIONS

Reference is hereby made to the following commonly assigned co-pending patent applications filed on even date herewith entitled:

(1) "Processor and Method for Processing Photographic Film Discs," (Ser. No. 432,860); and (2) "Dryer Apparatus for Film Disc Processor," (Ser. No. 432,819).

BACKGROUND OF THE INVENTION

1. Field of the Invention

The present invention relates to automatic photoprocessing equipment for the processing of undeveloped photographic film. In particular, the invention relates to a control apparatus for a horizontal in-line film disc processor.

2. Description of the Prior Art

The processing of photographic film includes contacting the film with a plurality of processing fluids in a selected order and for selected time periods to properly develop the images thereon. Because the film is light-sensitive, the processing must be done in the dark. Once the film has been contacted with the fluids as desired, it is also necessary to dry the film before further processing can be performed, such as making prints or slides. Numerous machines have been devised for processing film in strip or web form. However, this type of apparatus is wholly unsuited for processing film in a disc film format where the individual photographic images are located circumferentially about a central hub, as shown, for example, in U.S. Pat. No. 4,194,822, granted to Sethi on Mar. 25, 1980. Thus, the introduction of cameras using film in a disc film format has led to the development of processing machines specifically for film discs.

Processing devices developed specifically for disc film include the devices shown in the following U.S. patents:

| Patentee | U.S. Pat. No. | Issue Date |
|---|---|---|
| Michal | 4,252,430 | 02/24/81 |
| Harvey | 4,188,106 | 02/12/80 |
| Solomon | 4,178,091 | 12/11/79 |
| Hutchinson | 4,167,320 | 09/11/79 |
| Harvey | 4,112,454 | 09/05/78 |
| Hutchinson | 4,112,453 | 09/05/78 |
| Patton | 4,112,452 | 09/05/78 |

In addition to the devices shown in these patents, several disc film processing devices are shown in the following Research Disclosures:

| Disclosure No. | Title |
|---|---|
| 172 Research Disclosure, August 1978 | |
| 17258 | Horizontal In-Line Photofinishing Processor |
| 17262 | Method and Apparatus for Treating Elements of Photographic Film |
| 17263 | Improved Horizontal Film-Processing Apparatus |
| 17264 | Improved Vertical Film-Processing Apparatus |
| 17265 | Rotary Film-Processing Apparatus |
| 174 Research Disclosure, October 1978 | |
| 17429 | Processor Concept |

Disc film processing devices are also shown in two brochures of the Eastman Kodak Company of Rochester, New York, entitled "KODAK Disc Film Processor, Model 200" and "KODAK Disc Film Processor, Model 1000."

In some applications, it is desirable to process a relatively small number of film discs at one time quickly and without waste of processing fluids or energy. Since the processing of such film discs must be carried out in the dark, the processing machine must either be located in a dark room or have its processing portion completely covered to prevent damage to the photographic images carried on the film.

As shown in many of the devices disclosed above, it is efficient to process a plurality of the film discs together by mounting them on a spindle, which is then carried through the processor from start to finish as a unit. The spindle with the film discs secured thereon is conveyed from tank to tank of processing fluid in sequence, with the spindle being rotated to uniformly coat the film discs with processing fluid.

The various functions of the prior art processors cited above are controlled both mechanically and electromechanically, such as by a microprocessor or computer. Specifically, the device disclosed in the "KODAK Disc Film Processor, Model 1000" brochure has a microprocessor to control all of its processing functions. Such control means for disc film processors are also similarly discussed in the Patton U.S. Pat. No. 4,112,452 (col. 7, lines 16–27).

None of these prior art devices discloses an automatic processor for undeveloped photographic film discs which has a control apparatus for controlling the operation of the spindle conveying means, processing fluid dispensing means, and tank drive means which moves the processing tanks between an upward process position and a downward dump and transport position. Film disc processors of the prior art do not provide for efficient, quick and clean replacement of the processing fluids for each separate spindle during processing. Draining the processing fluids from the tanks through separate drains has simply proved to be too slow—only by dumping the processing fluid from the processing tanks can high speed replacement of the processing fluid be obtained.

SUMMARY OF THE INVENTION

The present invention comprises a control apparatus for a processor which processes a plurality of undeveloped photographic film discs mounted on a spindle assembly. The processor includes spindle sensing means for providing a spindle present signal indicative of the presence of the spindle assembly at a first end of the processor and conveyor means for conveying the spindle assembly from the first end to a second end of the processor intermittently along a generally horizontal conveyor path to each of a plurality of processing stations. A processing tank is provided at each processing station for containing processing fluid. The tanks are moved between an upward process position and a downward dump and transport position by tank drive means, and fluid dispensing means at the processing station dispense processing fluid into the processing tank at that processing station when the tank is in its upward process position. The processor has control means for controlling the operations of the conveyor means, the tank drive means and the fluid dispensing means as a function of the location of each spindle assembly within the processor.

The control apparatus of the present invention provides simple and efficient means for controlling the processing of film discs mounted on a spindle assembly. Each spindle assembly is automatically advanced through a complete processing cycle once the presence of the spindle assembly in the processor has been sensed by the spindle sensing means. After receiving the signal from the spindle sensing means, the control means initiates and continues the operations of the various functional components of the processor until the film discs on the spindle assembly are fully developed and the spindle assembly has reached the second end of the processor.

DETAILED DESCRIPTION OF THE PREFERRED EMBODIMENTS

(1) General System Description

Figure 1:
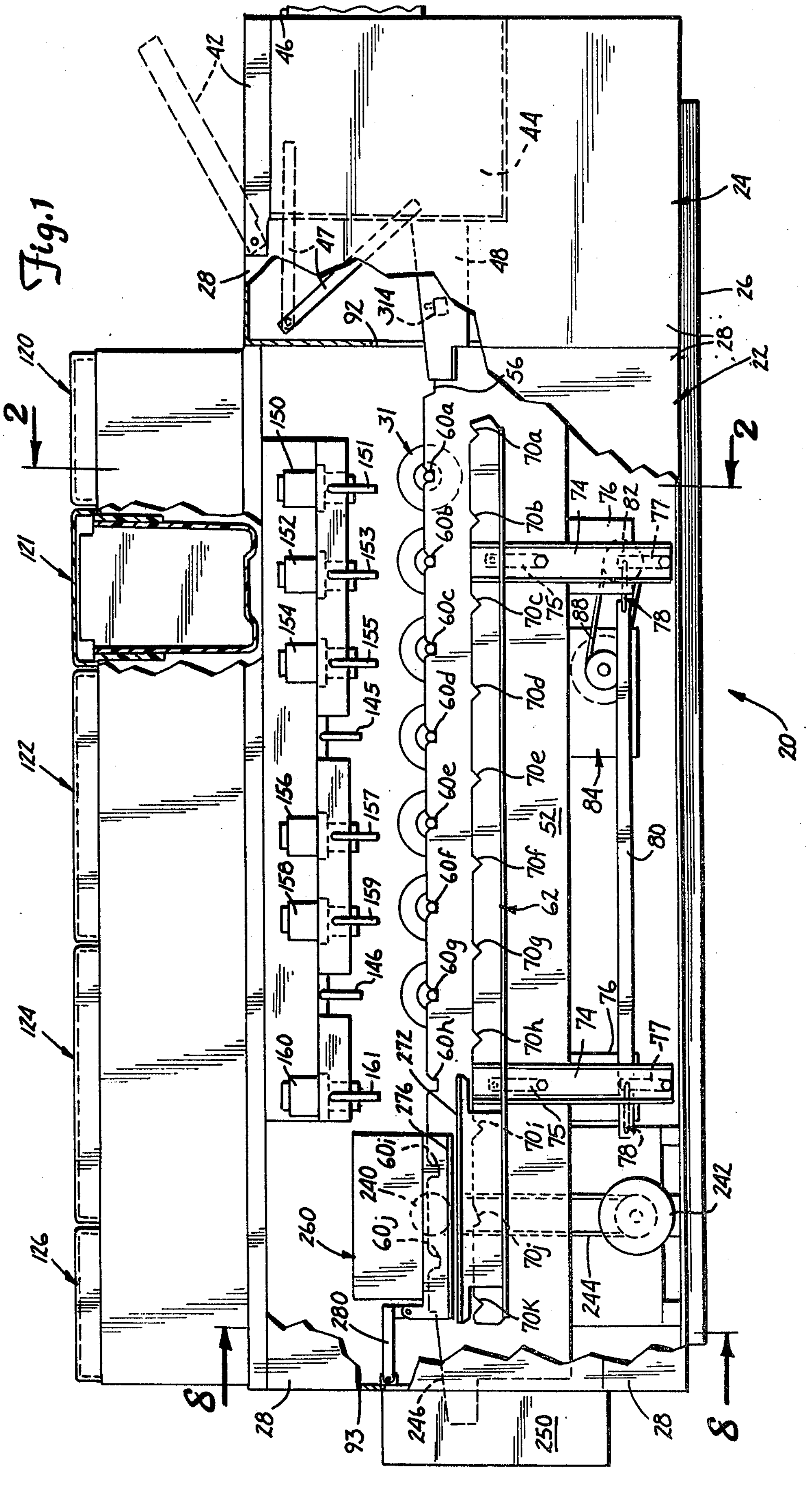
FIG. 1 is a side elevational view of the film disc processor of the present invention with some parts broken away and shown in section.

The processor 20 of the present invention is generally shown in its entirety in FIG. 1 (Sheet 1). The processor 20 is divided into two sections, a processing section 22 and a loading section 24, both of which are supported on a base portion 26. A cover 28 (only partially shown) covers the processing and loading sections 22 and 24 to prevent light from entering the processor and ruining the photographic images on the film discs. The processor 20 is thus operational in a lighted room—it does not need to be located in a darkroom to prevent exposure of the images on the film discs being processed.

Figure 2:
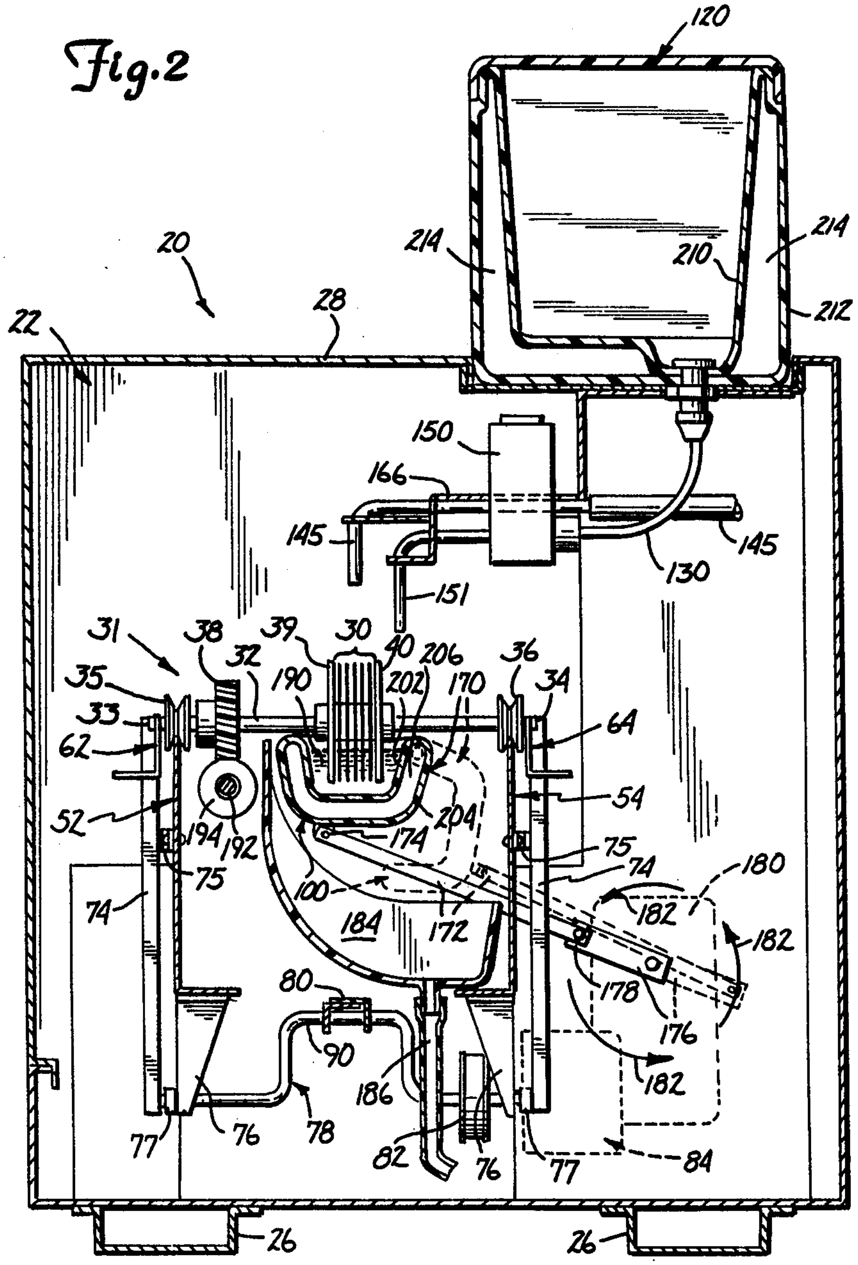
FIG. 2 is a sectional view as taken generally along line 2—2 in FIG. 1 (with the carriage rails of the spindle assembly conveyor in an intermediate position).

As best shown in FIG. 2 (Sheet 2), a plurality of film discs 30 are carried on a spindle assembly 31 during processing in the processor 20. The spindle assembly 31 has a spindle shaft 32 which, in turn, has a first end portion 33 and and a second end portion 34 and defines an axis of rotation for the spindle assembly 31. Rotation bearings 35 and 36 are mounted on the spindle shaft 32 proximate its first and second end portions 33 and 34, respectively. A spindle gear 38 is attached to the spindle shaft 32 adjacent its first end portion 33, and film hubs 39 and 40 are mounted on the spindle shaft 32 to maintain the film discs 30 proximate a central portion of the spindle assembly 31. The bearing 36 and the hub 40 are selectively removable from the spindle shaft 32 to permit the placement and removal of film discs 30 on the spindle shaft 32.

The film discs 30 are loaded on the spindle assembly 31 in the loading section 24 of the processor 20. As shown in FIG. 1, the loading section 24 has a top door 42 for access to the loading section 24. The various components of the spindle assembly 31 and the film discs 30 (while still in their light-tight camera cartridges (not shown)) are placed in a loading chamber 44 in the loading section 24. The top door 42 shuts light-tight so that when closed, no light enters the loading chamber 44.

To prepare the film discs 30 for processing, an operator reaches through a pair of light-tight arm sleeves 46 (only a portion of one which is shown) to remove the film discs 30 from their light-tight cartridges and place them on the spindle shaft 32. Once the desired number of film discs 30 are placed on the spindle shaft 32 (in the example shown in FIG. 2, five (5) film discs 30 are shown mounted on the spindle assembly 31), the removable hub 40 and bearing 36 are placed on the spindle shaft 32. The film disc-laden spindle assembly 31 thus appears generally as shown in FIG. 2 for processing.

Figure 3:
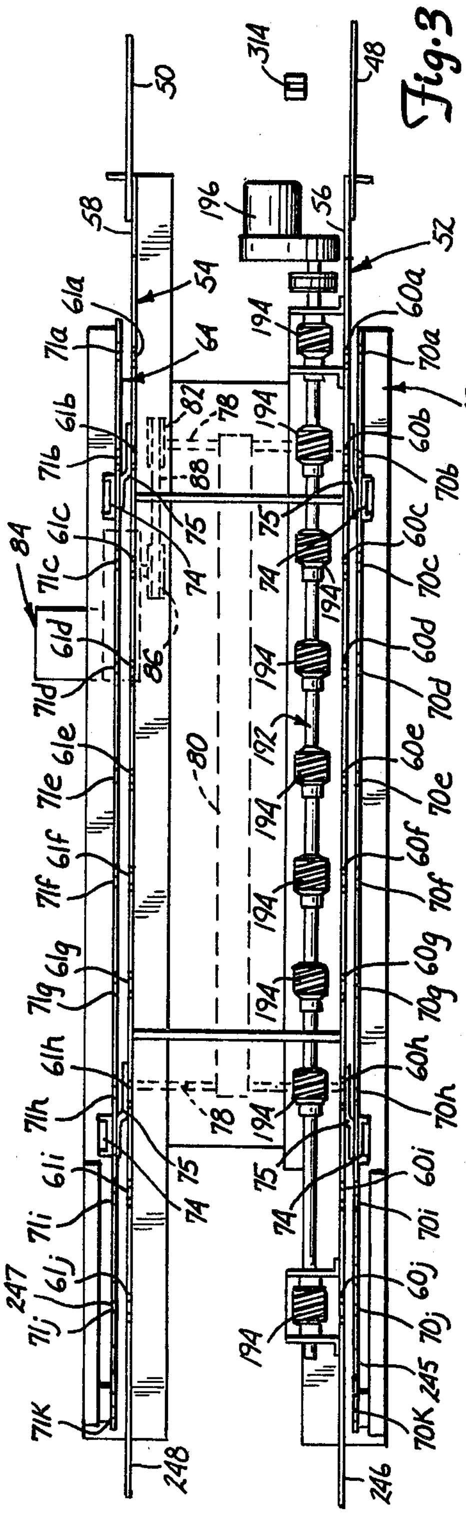
FIG. 3 is a top plan view of the spindle assembly conveyor path on the film disc processor.

To transfer the spindle assembly 31 and film discs 30 thereon to the processing portion 22 of the processor 20, the operator opens an inner door 47 and places the spindle assembly on a pair of parallel ramps 48 and 50 (as shown generally in FIGS. 1 and 3 (Sheet 3)). The inner door 47 is normally in a closed position (as shown partially in solid in FIG. 1), but can be swung upwardly to an open position (as shown in phantom in FIG. 1) to permit the transfer of the spindle assembly 31 from the loading section 24 to the processing section 22 of the processor 20. The inner door 47 provides an additional light-tight barrier to protect the images on the film discs 30 being processed in the processing section 22. Thus, the top door 42 can be safely opened to place additional spindle assembly components and cartridges of film discs in the loading chamber 44 immediately after a spindle assembly 31 has been transferred to the processing section 22 of the processor 20.

The bearings 35 and 36 of the spindle assembly 31 rest on the ramps 48 and 50, respectively, and the ramps are slanted downwardly away from the loading chamber 44 so that the spindle assembly 31 rolls (by gravity) down the ramps from the loading section 24 to the processing section 22. Upon reaching the lower end of the ramps 48 and 50, the spindle assembly 31 drops onto a pair of spaced generally horizontal stationary rails 52 and 54. As best shown in FIGS. 1 and 3, the ramps 48 and 50 actually lead to matched pair of a station pickup notches 56 and 58 on the stationary rails 52 and 54, respectively. The station pickup notches 56 and 58 are designed to hold the spindle assembly 31 (via the bearings 35 and 36 adjacent its first and second end portions 33 and 34)

immediately prior to actual processing of the film discs 30.

The stationary rails 52 and 54 are parallel and have a plurality of laterally matched pairs of station notches (shown as station notches 60*a* through 60*j* and 61*a* through 61*j*, respectively) spaced along their upper edges. Each pair of station notches is designed to hold the spindle assembly 31 (via the bearings 35 and 36 adjacent its first and second end portions 33 and 34) in position for processing at one of a plurality of processing stations along a generally horizontal conveyor path. Each processing station corresponds in position to one of the matched pairs of station notches and is provided with some means for processing the film discs 30 on the spindle assembly 31 when the spindle assembly 31 is held in the matched pair of station notches at that particular processing station.

A pair of spaced generally horizontal carriage rails 62 and 64 are movably mounted with respect to the stationary rails 52 and 54. The carriage rails 62 and 64 are parallel and as best shown in FIGS. 1 and 2, each carriage rail is secured to a pair of longitudinally spaced upright legs 74. The legs 74 of each carriage rail are, in turn, pivotally secured to their respective stationary rail by a pair of upper crank members 75. Adjacent their lower ends, the legs 74 of each carriage rail are pivotally secured to lower extending portions 76 of their respective stationary rails by a pair of lower crank members 77.

The legs 74 and crank members 75 and 77 of each carriage rail are in spaced, laterally matched relationship with one another relative to the conveyor path, as defined by the stationary rails 52 and 54 and carriage rails 62 and 64, and shown in FIG. 3. Each laterally matched pair of lower crank members 77 is secured to a drive link 78. The drive links 78 are linked for coupled movement by a coupling brace 80. One of the drive links 78 has a drive gear 82 mounted thereon. A carriage drive motor 84 is mounted on the processor 20 a spaced distance from the drive gear 82 and is rotatably coupled to the drive gear 82 by suitable means, such as a belt drive 88 to rotate the drive gear 82 and drive link 78 upon which it is mounted.

As best shown in FIG. 2, a portion 90 of each drive link 78 is spaced parallel to the rotational axis of the drive gear 82 and drive link 78. The coupling brace 80 is pivotally secured upon this spaced portion 90 to follow a closed circular path of rotation about the axis of rotation of the drive link 78 as it is rotated by the carriage drive motor 84. The crank members 75 and 77 (with each lower crank member 77 being secured to one of the drive links 78) also follow closed circular paths of rotation for each rotation of the drive links 78. In turn, the legs 74 and carriage rails 62 and 64 simultaneously follow closed circular paths of rotation for every rotation of the drive links 78 (as driven by the carriage drive motor 84). These components constitute a carriage rail drive assembly for moving the carriage rails. Essentially, the legs 74, carriage rails 62 and 64, cranks 75 and 77, drive links 78 and coupling brace 80 are connected to form a classical four-bar linkage mechanism.

The carriage rails 62 and 64 have a plurality of laterally matched pairs of carriage notches 70*a* through 70*j* and 71*a* through 71*j*, respectively, spaced along their upper edges. Each pair of carriage notches is designed to engage the spindle assembly 31 (via bearings 35 and 36 adjacent its first and second end portions 33 and 34) as it is conveyed by the carriage rails 62 and 64 from one pair of station notches to the next on the stationary rails 52 and 54. Since the carriage rails 52 and 54 move through closed circular paths when moved, it follows that each pair of carriage notches also moves through a separate closed circular path during such movement.

The stationary rails 52 and 54, carriage rails 62 and 64 and carriage rail drive assembly define conveyor means for intermittently conveying the spindle assembly 31 sequentially to each of the processing stations along the conveyor path (from a first end 92 to a second end 93 of the processing section 22). The intermittent conveying of the spindle assembly 31 by the conveyor means is cyclical, with each conveyor cycle having a processing portion (when the spindle assembly 31 is held in position for processing by the station notches adjacent each processing station) and a transport portion (when the spindle assembly 31 is conveyed from one station to the next along the conveyor path). For example, when processing is completed at a first processing station, the carriage drive motor 84 is activated to cause one rotation of the drive links 78 about their axis of rotation, which in turn causes the carriage rails 62 and 64 to move simultaneously upwardly through their closed circular paths so that one pair of the carriage notches thereon engages the end portions 33 and 34 of the spindle assembly 31 being held at that first processing station. The carriage rails 62 and 64 continue moving simultaneously upwardly to lift the spindle assembly 31 off of the station notches at the first processing station, then carry the spindle assembly 31 generally horizontally along the conveyor path to a second processing station and then downwardly to deposit the spindle assembly 31 on the station notches of the second processing station, thereby completing the transport portion of one conveying cycle.

Figure 4:
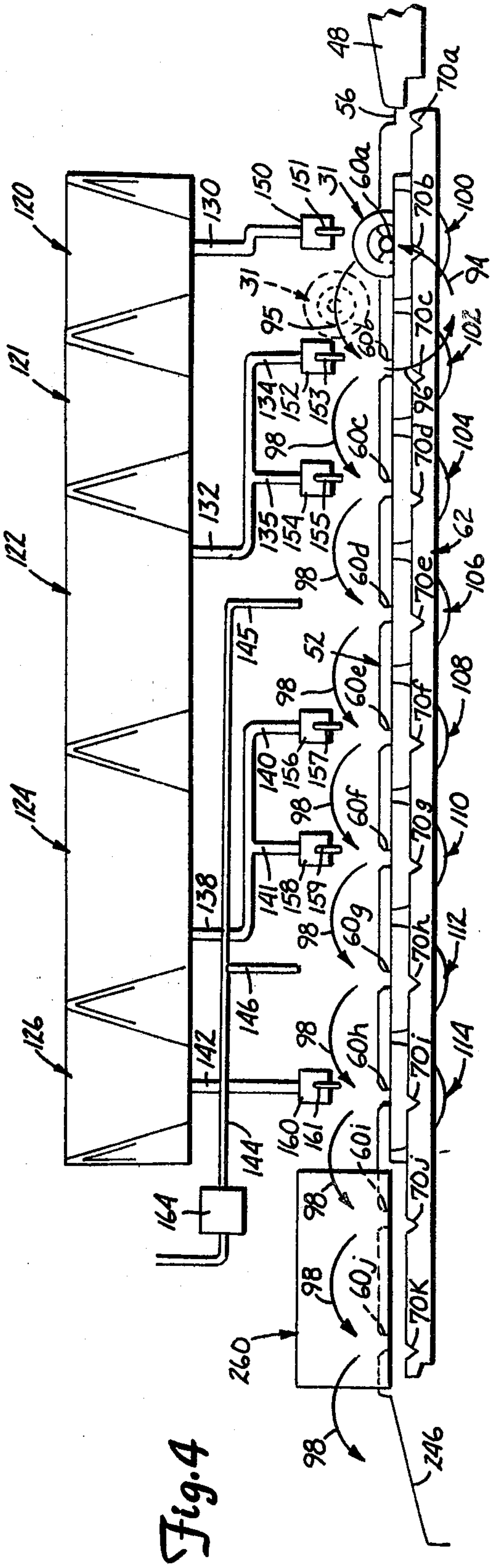
FIG. 4 is a schematic view depicting the spindle assembly conveying and fluid processing systems of the film disc processor.

This cyclical movement is shown generally schematically in FIG. 4. The spindle assembly 31, as shown, is in position at a first processing station adjacent station notches 60*a* and 61*a* (notch 61*a* not shown in FIG. 4). The spindle assembly 31 is advanced to a next or second processing station (adjacent station notches 60*b* and 61*b* (notch 61*b* not shown in FIG. 4)) by the carriage rails being moved through their closed circular path which moves the carriage notches on the carriage rails 62 and 64 through closed circular paths also. In particular, carriage notches 70*b* and 71*b* (notch 71*b* not shown in FIG. 4) move through a circular path as defined by arrows 94, 95, and 96. The carriage rails move from a first rails down position (as shown in FIGS. 1 and 4) through a circular path about an axis normal to the conveyor path. During this movement, carriage notches 70*b* and 71*b* move as defined by arrow 94 to engage the spindle assembly 31 positioned at the station notches 60*a* and 61*a*. Continuing on, carriage notches 70*b* and 71*b* move upwardly as defined by arrow 95 to carry the spindle assemby 31 to the second processing station adjacent station notches 60*b* and 61*b*. The spindle assembly 31 is deposited at station notches 60*b* and 61*b* and the carriage notches 70*b* and 71*b* continue downwardly following the path of arrow 96 as the carriage rails 62 and 64 return to the first rails down position. The spindle assembly 31 is thus conveyed along the conveyor path by the conveyor means (as indicated generally by arrows 98 in FIG. 4) so that it has an axial direction which is generally horizontal and perpendicular to the conveyor path.

(2) Processing Fluid System

At the first eight processing stations, processing tanks are provided for containing processing fluid. The processing tanks (shown as processing tanks 100, 102, 104, 106, 108, 110, 112 and 114) are positioned relative to the station notches on the carriage rails as shown in FIG. 4. Each processing tank is generally identical, and like the processing tank 100 (shown sectionally in FIG. 2), each processing tank provides a means for contacting the film discs 30 mounted on the spindle assembly 31 with processing fluid.

The processing fluid which is selectively introduced into each processing tank is obtained from a processing fluid source, such as a processing fluid reservoir tank. In general terms, the processing fluids or "chemistry" which are used to develop or process the photographic images on the film discs include the following processing fluids: developer, bleach, wash water, fix and stabilizer. For proper processing, the film discs must be contacted by these fluids in a selected sequence. Thus, the processing fluid tanks 100 through 114 are arranged for such sequential contact. That sequence is as follows: processing tank 100 contains developer; processing tanks 102 and 104 contain bleach; processing tank 106 contains wash water; processing tanks 108 and 110 contain fix; processing tank 112 contains wash water; and processing tank 114 contains stabilizer.

Preferably, each of these processing fluids (except for the wash water) comes from a reservoir tank located on the processor 20. As shown schematically in FIG. 4, there are reservoir tanks 120 and 121 for developer, a reservoir tank 122 for bleach, a reservoir tank 124 for fix and a reservoir tank 126 for stabilizer. From each separate reservoir (except reservoir tank 121), processing fluid conduit means carries and dispenses the processing fluid to the correct processing tank or tanks. Reservoir tank 121 is a staging tank for developer, and is not directly connected to the processing tanks.

As shown in FIG. 4, developer is carried from the developer reservoir tank 120 to processing tank 100 by developer flow line 130. Similarly, bleach is carried from the bleach reservoir tank 122 to the processing tanks 102 and 104 by bleach flow line 132 and first bleach branch line 134 and second bleach branch line 135; fix is carried from the fix reservoir tank 124 to the processing tanks 108 and 110 through fix flow line 138 and first fix branch line 140 and second fix branch line 141; and stabilizer is carried from the stabilizer reservoir tank 126 to the processing tank 114 through stabilizer flow line 142. Wash water is usually obtained from the tap. In the processor 20, the wash water is carried from its source to the processing tanks 106 and 112 through wash water flow line 144 and wash water branch lines 145 and 146.

A fluid dispensing valve is located adjacent a lower processing tank end of each flow line or branch line (except for the wash water branch lines). As shown in FIG. 2, a first fluid dispensing valve 150 is connected to the developer flow line 130, and has a developer dispensing tube 151 extending therefrom and positioned to dispense developer from the reservoir tank 120 into the processing tank 100. As shown in FIGS. 1 and 4, a second fluid dispensing valve 152 and a third fluid dispensing valve 154 are positioned in the first bleach branch line 134 and second bleach branch line 135, respectively. The second fluid dispensing valve 152 has a first bleach dispensing tube 153 extending therefrom and positioned for dispensing bleach into the processing tank 102. The third fluid dispensing valve 154 has a second bleach dispensing tube 155 extending therefrom and positioned to dispense bleach into the processing tank 104. A fourth fluid dispensing valve 156 positioned in the first fix branch line 140 has a first fix dispensing tube 157 extending therefrom for dispensing fix into the processing tank 108, a fifth fluid dispensing valve 158 positioned in the second fix branch line 141 has a second fix dispensing tube 159 extending therefrom for dispensing fix into the processing tank 110, and a sixth fluid dispensing valve 160 positioned in the stabilizer flow line 142 has a stabilizer dispensing tube 161 extending therefrom for dispensing stabilizer into the processing tank 114.

The wash water flow line 144 (FIG. 4) also has a wash water dispensing valve 164, which controls the total volume of wash water dispensed by both wash water branch lines 145 and 146 during each conveyor cycle. In addition, as best shown in FIG. 2, the ends of the wash water branch lines 145 and 146 adjacent the processing tanks 106 and 112 are positioned so that the wash water is impinged directly onto the film discs 30 and central portion of the spindle shaft 32 for maximum rinse efficiency.

Figure 5:
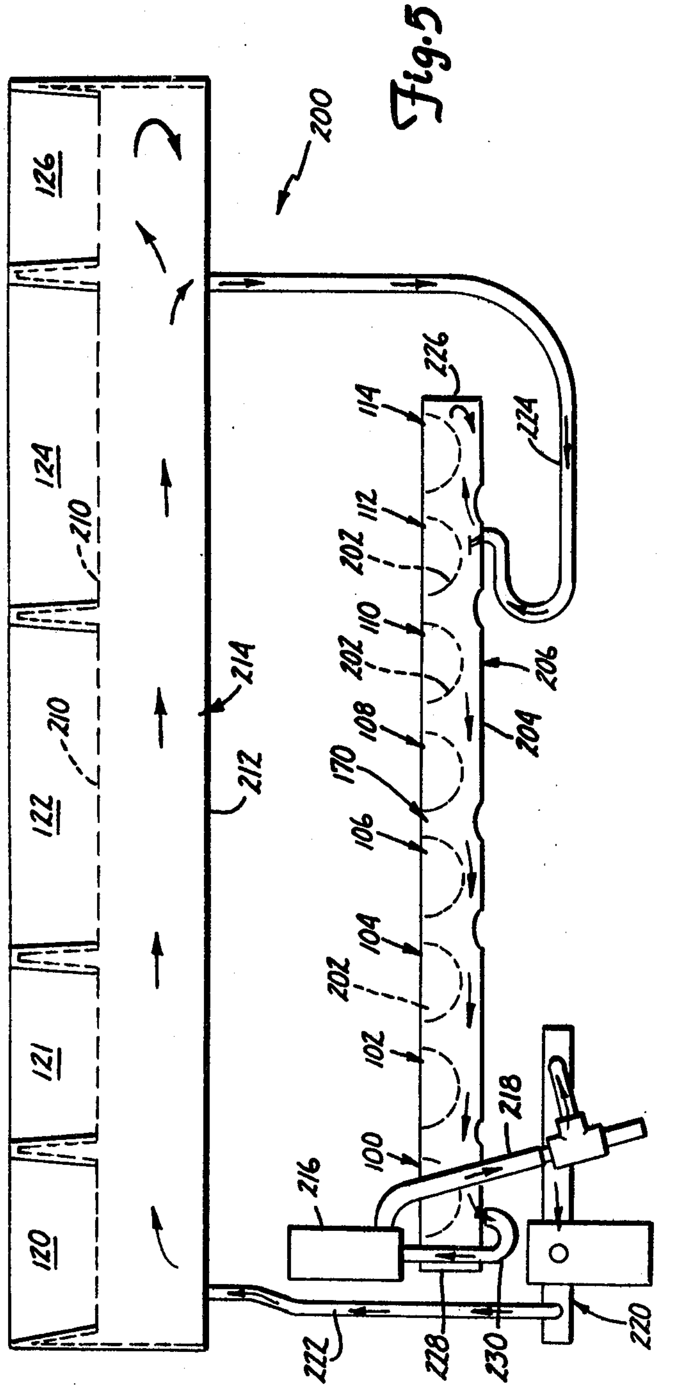
FIG. 5 is a schematic view (from the rear of the processor) depicting the fluid tempering system of the film disc processor.

As shown generally in FIGS. 4 and 5 (Sheet 4), the processing tanks are connected to form a single processing tank unit 170. As best shown in FIG. 2, the processing tank unit 170 is pivotally mounted adjacent one longitudinal edge along a pivot axis extending generally parallel to the conveyor path. Thus, all of the processing tanks comprising the processing tank unit 170 are pivotally mounted on a common axis which is generally perpendicular to the axis of the spindle assembly 31. A first end of an elongated connecting link 172 is pivotally mounted at 174 adjacent a bottom edge of the processing tank unit 170. A second end of the elongated link 172 is pivotally mounted to a rotating member 176 as at 178. The rotating member 176 is, in turn, fixed to the drive shaft of a tank drive motor 180. In FIG. 2, the processing tank unit 170 is shown in solid lines in an upward process position wherein a portion of each film disc 30 mounted on the spindle assembly 31 is placed within one of the processing tanks when the spindle assembly 31 is positioned at that processing tank's processing station.

A single rotation of the drive shaft of the tank drive motor 180 causes the rotating member 176 to rotate in such a manner that the pivotal connection point 178 between the elongated link 172 and rotating member 176 follows the circular path defined by arrows 182 in FIG. 2. After half a rotation, the rotating member 176, elongated link 172 and processing tank unit 170 are moved to position as shown in phantom in FIG. 2. When the processing tank unit 170 is pivoted about its longitudinal pivot axis downwardly to this dump/transport position, any processing fluid that was in the processing tanks is dumped from the processing tanks into a plurality of used fluid disposal basins 184 (only one of which is shown in FIG. 2). During the second half of a rotation, the rotating member 176, elongated link 172 and processing tank unit 170 are returned to position as shown in solid lines in FIG. 2.

The pivoting of the processing tank unit 170 is intermittent, operating in coordination with the intermittent conveying of the spindle assembly 31 along the conveyor path by the conveyor means. The pivoting of the processing tank unit 170 takes place during the transport portion of the conveyor cycle.

The processing tank unit 170 is placed in its process position as the spindle assembly 31 is placed in position at a selected processing station for contacting the film discs 30 thereon with processing fluid. Then, the processing tank at the selected processing station is filled with processing fluid to a level wherein a portion of each film disc 30 mounted on the spindle assembly 31 contacts the processing fluid, as shown, for example, by the level of processing fluid 190 (which is in this case is developer) in the processing tank 100. When the processing portion of the conveyor cycle is completed, the processing tank unit 170 is pivoted downwardly to its dump/transport position to permit the carriage rails 62 and 64 to advance the spindle assembly 31 along the conveyor path and to dump the used processing fluid from the processing tank at the selected processing station.

The disposal basins 184 are formed to collect all the processing fluid dumped from the processing tanks on the processing tank unit 170 as it pivots downwardly to its dump/transport position. Processing fluids are collected in the disposal basins 184 and flow therefrom through drain systems (shown generally as 186) to be collected or disposed of.

(3) Spindle Assembly Rotation

Since only a portion of the film discs 30 mounted on the spindle assembly 31 contact the processing fluid when the spindle assembly 31 is positioned at one of the processing stations for fluid processing, it is necessary to rotate the film discs 30 so that all the photographic images thereon are uniformly contacted by the processing fluid. This rotation is achieved by rotating the spindle shaft 32 (which is keyed for coupled rotation to the film discs 30 by suitable means (not shown)). To this end, spindle drive means for rotating the spindle assembly 31 about its longitudinal axis (as defined by spindle shaft 32) when it is positioned at each processing station is provided along the conveyor path.

The spindle drive means comprises a spindle drive shaft 192 rotatably positioned parallel to the conveyor path, with the spindle drive shaft 192 having a drive gear 194 fixed thereon adjacent selected processing stations. The spindle drive shaft 192 is rotatably coupled to a spindle drive motor 196 by suitable means (such as a belt drive system or by sprocket gears) so that the spindle drive shaft 192 is rotated when the spindle drive motor 196 is actuated. Thus, when the spindle assembly 31 is placed in position at one of the processing stations having a drive gear 194 adjacent thereto, the spindle gear 38 of the spindle assembly 31 engages the spindle drive gear 194 at that processing station to cause the spindle assembly 31 to be rotated at a first rate of rotation, along with the film discs 30 thereon. Processing fluid in the processing tank at that processing station thus uniformly contacts the entire area of each film disc containing photographic images.

(4) Tempering System for Processing Fluids

To obtain a proper reaction between chemistry and film, certain processing fluids must be maintained at selected temperatures during processing. Usually, this means heating the fluid above the temperature that it would be if left standing at room temperature. The processor 20 of the present invention includes a processing fluid tempering system 200, as shown generally in FIG. 5. This tempering system 200 surrounds each processing tank to maintain the temperature of the processing fluid in the processing tank at a desired temperature. In addition, the processing system 200 also surrounds each reservoir tank to similarly maintain the processing fluids therein at the desired temperature.

As shown in FIG. 2, each processing tank (processing tank 100 is shown as typical of the processing tanks) has an inner wall 202 which defines a fluid basin for retaining the processing fluid in the processing tank. Spaced from the inner wall 202 is an outer wall 204, with the space therebetween defining a tempering fluid cavity 206. Tempering fluid is circulated through the cavity 206 of each processing tank and preferably, the cavities 206 of the processing tanks are interconnected so that tempering fluid is circulated through the processing tank cavities collectively. When connected and formed in this manner, the outer wall 204 of each processing tank constitutes the generally outer wall of the processing tank unit 170, with each processing tank having a separate inner wall 202, as shown in FIG. 5.

FIG. 2 also shows that each reservoir tank has a first wall 210 which defines a fluid chamber for retaining the processing fluid in the reservoir tank (reservoir tank 120 is shown as typical of the reservoir tanks). Spaced from the first wall 210 is a second wall 212 with a space therebetween defining a tempering fluid cavity 214. Tempering fluid is circulated through the cavity 214 of each reservoir tank and preferably, the cavities 214 of the reservoir tanks are interconnected so that the tempering fluid is circulated through the reservoir tank cavities collectively, as shown in FIG. 5.

The tempering fluid is pumped through the processing fluid tempering system 200 by a pump 216 in direction generally shown by flow arrows in the system in FIG. 5. Tempering fluid is pumped from the pump 216 through a first fluid conduit 218 to a fluid heater 220 which heats the fluid to a desired temperature. From the heater 220, the tempering fluid flows through a second fluid conduit 222 into the interconnected cavities 214 of the reservoirs adjacent the reservoir tank 120 (for developer). The tempering fluid flows through the cavities 214 past the reservoir tanks 122 and 124 (for fix and bleach, respectively) and exits the cavities 214 adjacent the reservoir tank 126 (for stabilizer). The tempering fluid also flows past the reservoir tank 121, which is a staging tank for developer. The reservoir tank 121 is provided so that when the reservoir tank 120 is low on developer, the developer in reservoir tank 121 (which has been heated by the tempering fluid to the desired temperature) can be dumped into the reservoir tank 120 to replenish the supply of developer with minimal disruption to the operations and quality of the processor.

A third fluid conduit 224 is connected at one end to the cavities 214 of the reservoir tanks adjacent the reservoir tank 126. Adjacent its other end, the third fluid conduit 224 is connected to the interconnected cavities 206 of the processing tank unit 170 adjacent a first end portion 226 thereof. The third fluid conduit 224 is flexible to permit the pivoting of the processing tank unit 170 (and processing tanks therein) between the process and dump/transport positions, while carrying the tempering fluid between the cavities 206 and 214 of the processing tanks and reservoir tanks. The tempering fluid flows through the cavities 206 past the processing tanks and exits the cavities 206 adjacent a second end portion 228 of the processing tank unit 170.

A fourth fluid conduit 230 carries the tempering fluid from the cavities 206 in the processing tank unit 170 back to the pump 216. The fourth fluid cavity 230 is also flexible to permit the pivoting of the processing tank unit 170 (and processing tanks therein) between the process and dump/transport positions, while carrying the tempering fluid between the pump 216 and the cavities 206 of the processing tanks.

The tempering fluid is thus heated and pumped through a closed system past all of the processing tanks and reservoir tanks. The processing fluid is maintained at the desired temperature both in the reservoir tanks and during processing when it is in the processing tanks. In essence, the processing fluid tempering system 200 consists of a plurality of first tempering fluid jackets around the processing tanks and a plurality of second tempering fluid jackets around the reservoir tanks, with the first and second fluid jackets being sealably connected and having tempering fluid circulating therein.

(5) Film Disc Dryer System

After the film discs 30 mounted on the spindle assembly 31 have been contacted with the processing fluids in the selected order, it is necessary to remove any processing fluid left on the film discs 30. Preferably, this is done by blowing tempered air past the film discs 30 and spinning the spindle assembly 31 at a high speed of rotation. To this end, two of the processing stations adjacent the second end 93 of the processing section 22 are film disc drying stations. (See FIGS. 1 and 3). A first drying station corresponds to the laterally matched pair of station notches **60*i* and 61*i* on the stationary rails 52 and 54 and a second drying station corresponds generally in position to the laterally matched pair of station notches 60*j* and 61*j* on the stationary rails 52 and 54**.

Figure 6:
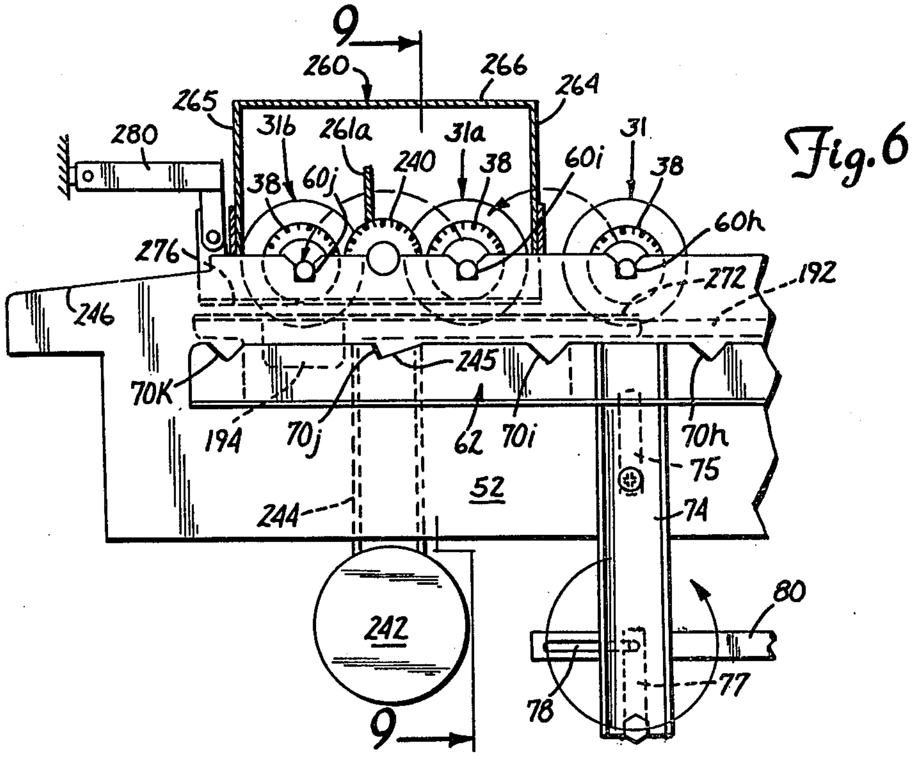
FIG. 6 is an enlarged side view of a portion of the spindle assembly conveyor showing the drying stations for the film discs with the dryer hood in its first lowered operational position.
Figure 7:
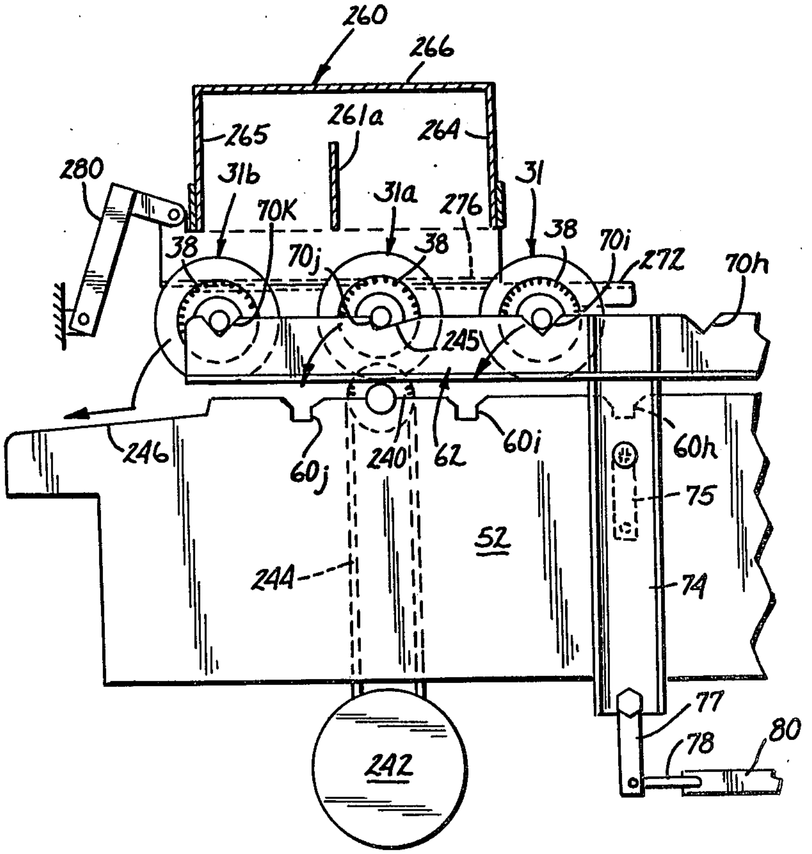
FIG. 7 is an enlarged side view of a portion of the spindle assembly conveyor showing the drying stations for the film discs with the dryer hood in its second raised operational position.
Figure 8:
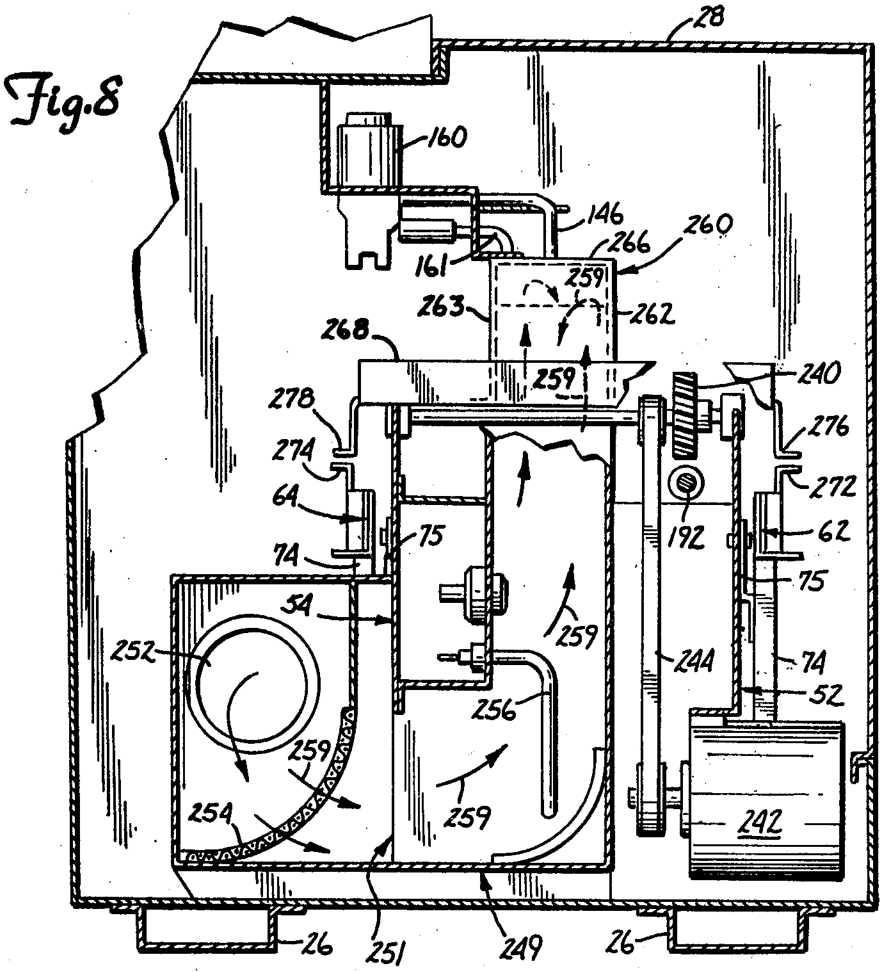
FIG. 8 is a sectional view as taken along line 8—8 in FIG. 1, with some parts removed and/or broken away for clarity.

At the first drying station, spindle spin means is positioned to rotate the spindle assembly 31 and film discs 30 mounted thereon at a second higher rate of rotation to dry the film discs 30 by centrifugal force. The spindle spin means includes a spin drive gear 240 rotatably positioned adjacent the first drying station, as shown in FIGS. 6 and 7 (Sheet 5). The spin drive gear 240 is rotatably coupled to a spin drive motor 242 by suitable means, such as a belt drive 244, as also shown in FIG. 8 (Sheet 6).

The spin drive motor 242 is a variable speed motor and is adapted to be operated such that when it is actuated to rotate a spindle assembly (shown as spindle assembly **31*a* in FIGS. 6 and 7) at the first drying station, the spin drive motor 242 rotates the spindle assembly 31*a* at both the first rate of rotation and the second higher rate of rotation for selected parts of the processing portion of each conveyor cycle. The spindle assembly 31*a* is initially rotated at the second higher rate of rotation to cast or throw residual processing fluid from the fluid discs 30 by centrifugal force. After a selected time, the spin drive motor 242 slows to rotate the spindle assembly 31*a*** at the first rate of rotation to further aid in drying the film discs mounted thereon.

The spindle assembly 31 is also rotated when positioned at the second drying station. However, the spindle assembly (shown as spindle assembly **31*b*) at the second drying station is rotated by the same drive means as used at the fluid processing stations. Thus, as best shown in FIGS. 3 and 6, the spindle gear 38 on the spindle assembly 31*b* engages the spindle drive gear 194 positioned adjacent the second drying station to rotate the spindle assembly 31*b* at the first rate of rotation. The carriage notches 70*j* and 71*j* have extension ramps 245 and 247 thereon to slightly lengthen the distance the spindle assembly is conveyed between the first drying station and the second drying station. The station notches at the first and second drying stations are also spaced slightly farther apart longitudinally than other adjacent station notches. This extra spacing is provided so that the spindle gear 38 is fully disengaged from the spin drive gear 240 when the spindle assembly 31*b*** is positioned at the second drying station.

The second drying station is the last processing station on the processor 20. When processing at the second drying station is completed for the spindle assembly **31*b*, the spindle assembly 31*b* is engaged by the laterally matched pair of carriage notches 70*k* and 71*k* on the carriage rails 62 and 64 and conveyed to a pair of parallel downwardly sloping processor exit ramps 246 and 248 on the stationary rails 52 and 54, respectively. As best shown in FIG. 1, the spindle assembly 31*b* will roll down the exit ramps 246 and 248 into a receiver box 250 at the second end 234 of the processor 20. An operator then retrieves the spindle assembly 31*b* with the processed and dried film discs thereon for further processing activity, such as making prints or slides from the photographic images on the film discs 30**.

In addition to spinning the spindle assemblies at the drying stations, tempered air is blown past the drying stations to dry the film discs 30. As shown in FIG. 8, a motorized fan 252 blows air past a filter 254 and then past a heating element 256. The air, now heated, is then directed upwardly by ducts generally shown as at 258 through the drying stations and past the film discs 30 mounted on the spindle assemblies 31 positioned at the drying stations (flowing generally as indicated by air flow arrows 259 in FIG. 8). The ducts 258 also then direct the air from the drying stations downwardly into an air intake (not shown) on the fan 252 to recirculate and reheat the air.

Figure 9:
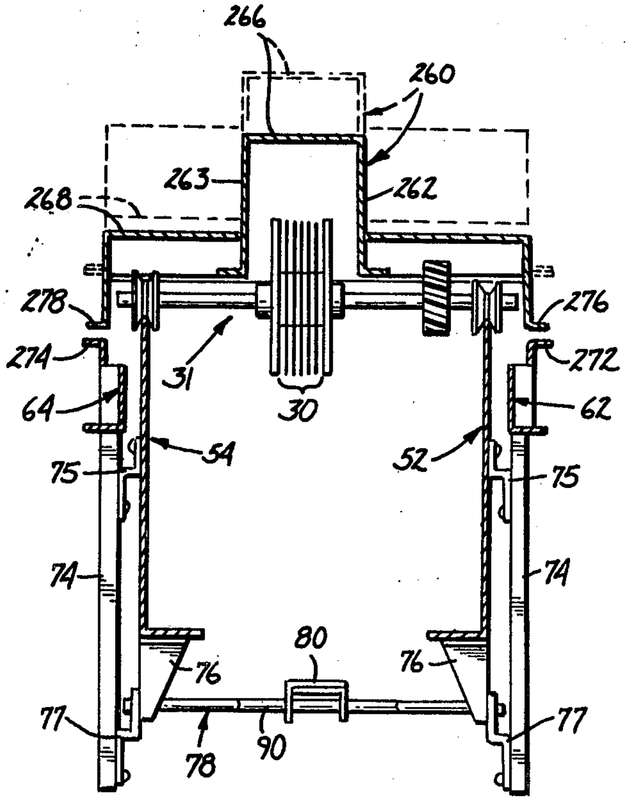
FIG. 9 is a sectional view as taken along line 9—9 in FIG. 6.

A dryer hood 260 encloses the drying stations when in a first lowered operational position (as shown in FIGS. 1, 6 and 8) to prevent fluid from being cast from the spinning film discs 30 into the rest of the processor 20 and to direct the tempered air from the fan 252 through the drying stations. The dryer hood 260 has first and second side walls 263 and 264 spaced apart and extending parallel to the conveyor path, and first and second end walls 264 and 265 spaced apart and extending perpendicular to the conveyor path. The side and end walls are joined together to form a dryer closure chamber, and a top panel 266 is connected to top edges of the side and end walls to cover the dryer closure chamber as shown. In addition, the dryer hood 260 is provided with a lower sheath area 268 which covers the end portions of the spindle assemblies 31 in the drying stations, as best shown in FIG. 9. The dryer hood 260 is movable between its first lowered operational position and a second raised position (shown in phantom in FIG. 9) to permit the advancement of the spindle assemblies 31 into and out of the drying stations.

Movement of the dryer hood 260 is intermittent, being synchronized with the movement of the carriage rails 62 and 64 so that the dryer hood 260 is moved to its second raised position when the spindle assembly 31 is moved from one station to the next along the conveyor path by the carriage rails. The dryer hood 260 is then moved to its first lowered operational position when the spindle assembly 31 is positioned at the next station by the carriage rails. These movements are coordinated because the dryer hood 260 is actually raised by the movements of the carriage rails 62 and 64. The carriage rails 62 and 64 have generally horizontal flange members 272 and 274 extending outwardly from adjacent the upper edges of their respective carriage rails 62 and 64, as shown in FIGS. 8 and 9. The dryer hood has first and second dryer hood supports 276 and 278 secured to each side thereof, with the dryer hood supports 276 and 278 being in general vertical alignment with the horizontal flange members 272 and 274, respectively, as shown in FIGS. 6–9.

Each cycle of the conveyor means moves the carriage rails 62 and 64 through their closed circular paths and simultaneously raises the flange members 272 and 274 into engagement with the dryer supports 276 and 278. This movement and engagement is perhaps best shown in a comparison of FIGS. 6 and 7 (with flange member 272 and dryer support 276 shown in phantom). In FIG. 6, the dryer hood 260 is in its first lowered operational position, the carriage rails are in their first rails down position, and the flange member 272 and dryer support 276 are not engaged. In FIG. 7, however, the carriage rails have been moved half way through their closed circular paths to a second rails up position, thereby raising the dryer hood 260 to its second raised position through engagement of the flange members 272 and 274 with the dryer supports 276 and 278, respectively. Upon moving through the rest of their closed circular paths, the carriage rails again lower the dryer hood 260 into its lowered operational position.

As the carriage rails 62 and 64 move through their closed circular paths, they move back and forth longitudinally relative to the conveyor path. Thus, each dryer support 276 and 278 is movably supported on its respective flange member 272 and 274 to permit the dryer hood 260 to remain generally in position over the drying stations as the carriage rails move longitudinally. To prevent the longitudinal movement of the carriage rails 62 and 64 from moving the dryer hood 260 from its position on the conveyor path adjacent the drying stations, the dryer hood 260 is pivotally secured to the processor 20 by a tether link 280. As shown, the tether link 280 is pivotally mounted to the dryer hood 260 adjacent its second end wall 265 and pivotally mounted to the processor 20 adjacent the second end 93 of the processing section 22. The tether link 280 connects the dryer hood 260 to the processor 20 and allows generally vertical movement of the dryer hood 260 while limiting its movement longitudinally with respect to the conveyor path. This dryer hood arrangement is suitable for use on other horizontal in-line film disc processors, such as the processors disclosed in related patent applications entitled "Magnetic Drive Mechanism for Film Disc Processor" Ser. No. 432,817) and "Dryer Apparatus for Film Disc Processor" (Ser. No. 432,810). Those applications, which are hereby incorporated by reference, are assigned to the same assignee as the present one.

(6) Processor Function Control

Figure 10:
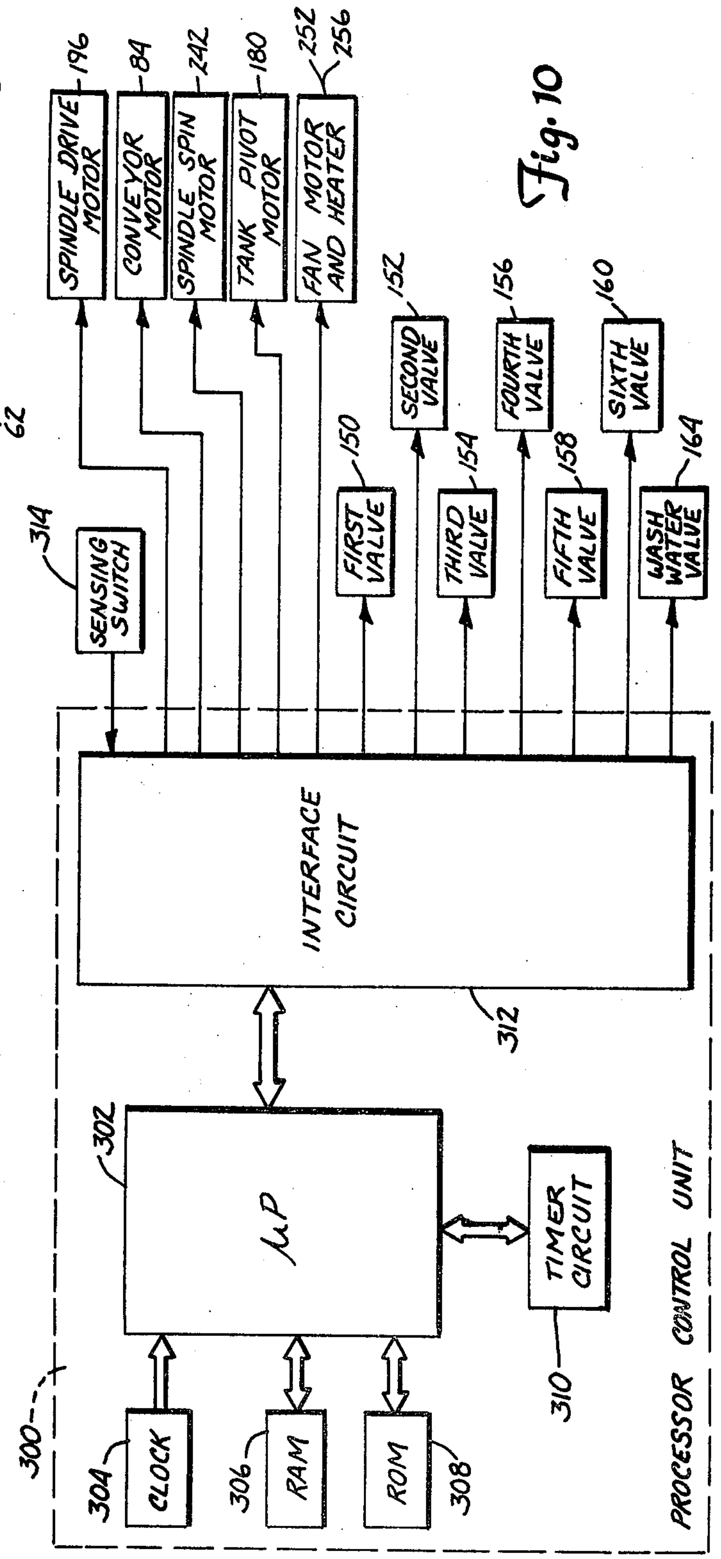
FIG. 10 is a block diagram of the control apparatus of the processor of the present invention.

FIG. 10 shows an electrical block diagram of a processor control unit 300. The processor control unit 300 includes microprocessor 302, clock 304, random access memory (RAM) 306, read only memory (ROM) 308, timer circuit 310 and interface circuit 312. The clock 304 supplies clock signals, together with some other related signals, to microprocessor 302. The timer circuit 310 also provides timing signals (for timing the various cycles and portions of cycles of operation of processor 20), to microprocessor 302. The microprocessor 302 addresses selected locations of RAM 306 or ROM 308, depending on signals it receives and a stored program contained in ROM 308. The interface circuit 312 supplies signals to and receives signals from the microprocessor 302 and from various electromechanically functional components of the processor 20 itself. The interface circuit 312 is essentially a conduit for transmitting control signals from the microprocessor 302 to control the functional operations of the processor 20.

Preferably, the processor 20 has eight fluid processing stations and two drying stations, as shown. A complete processing cycle is obtained when the spindle assembly 31 is conveyed to each processing and drying station in sequence (as shown generally by arrows 98 in FIG. 4) and is maintained for processing at each station for the time period defined by the processing portion of each conveyor cycle.

The presence of the spindle assembly 31 at the first end 92 of the processing section 22 triggers he beginning of the processing cycle for that spindle assembly 31 in the processor 20. A spindle sensing switch 314 (shown generally in FIGS. 1 and 3) is activated by the spindle assembly 31 as it rolls down the loading ramps 48 and 50. As indicated in FIG. 10, the sensing switch 314 provides a signal to the interface circuit 312 which in turn signals the microprocessor 302 that the spindle assembly 31 is present at the first end 92 of the processing section 22. In response to the signal from the sensing switch 314, the processor control unit 300 signals the various components of the processor 20 to begin a processing cycle for the spindle assembly 31 positioned in the station pickup notches 56 and 58 on the stationary rails 52 and 54.

A signal is provided from the processor control unit 300 to the conveyor motor 84 to activate it to move the carriage rails 62 and 64 once through their closed circular paths. In so moving, the carriage notches **70*a* and 71*a* on the carriage rails 62 and 64 will engage the spindle assembly 31 and convey it to the processing station defined by processing tank 100 and station notches 60*a* and 61*a* on the stationary rails 52 and 54**.

As the conveyor motor 84 is activated, another signal is also sent from the processor control unit 170 to activate the spindle drive motor 196 to run it continuously until the entire processing cycle for the spindle assembly 31 is completed. Once the spindle assembly 31 is positioned in the station notches **60*a* and 61*a* (after the transport portion of the conveyor cycle is completed), a solenoid connected to the first valve 150 is activated by a signal from the processor control unit 300 to open and close the valve 150 to dispense a selected volume of developer into the processing tank 100. Thus, the spindle assembly 31 is rotated at the first rate of rotation to uniformly contact the film discs 30 thereon with developer from the processing tank 100** during the processing portion of the conveyor cycle.

When the processing portion of the conveyor cycle is completed, the conveyor motor 84 is again signalled by the processor control unit to move the carriage rails 62 and 64 once through their closed circular paths. Thus, the spindle assembly 31 is engaged by the carriage notches **70*b* and 71*b* on the carriage rails 62 and 64 and conveyed to the next processing station defined by station notches 60*b* and 61*b* on the stationary rails 52 and 54**.

At the same time (during the transport portion of the conveyor cycle), the processor control unit 300 activates the tank drive motor 180 to run it through one rotational cycle to move the processing tank unit 170 from its process position to its dump/transport position and then back to its process position while the conveyor means is advancing the spindle assembly 31. The movement of the processing tank unit 170 dumps processing fluid from the processing tank 100 into its respective fluid disposal basin 184, and the spindle assembly 31 is moved along the conveyor path as the processing tank 100 is dumped. Once the spindle assembly 31 is in position at the processing station defined by station notches **60*b* and 61*b*, a solenoid connected to the second valve 152 is activated by a signal from the processor control unit 300 to open and close the second valve 152 to dispense a selected volume of bleach into the processing tank 102. Of course, the spindle assembly 31 is again rotated at the first rate of rotation to uniformly contact the film discs 30 thereon with bleach from the processing tank 102. Once the processing portion of the conveyor cycle is again completed, the processing control unit 300 activates the carriage drive motor 84 to move the carriage rails to advance the spindle assembly 31 and activates the tank drive motor 180 to dump the bleach from the processing tank 102**.

This basic signalling and activation procedure is repeated for the rest of the fluid processing stations, with signals being sent to the third valve 154, fourth valve 156, fifth valve 158, sixth valve 160 and wash water valve 164, when the spindle assembly is positioned at their respective processing tanks. The wash water valve 164 is operated in a slightly different manner from the other valves when a spindle assembly 31 is in position for processing adjacent processing tank 106 or 112. Instead of dispensing only a selected volume of wash water to fill the processing tanks 106 and 112, the wash water valve 164 is open for the entire processing portion of the conveyor cycle to continually impinge wash water down upon the film discs 30 rotating above the processing tank 106 or 112. This is done to obtain a more effective rinse of the film discs 30, rather than re-rinsing them with the same water in the processing tanks as they rotate. Excess wash water simply overflows from the processing tanks 106 and 112 into their respective fluid disposal basins 184 during the processing portion of the conveyor cycle. Any wash water left in those processing tanks at the end of the processing portion is dumped when the processing tank unit 170 is pivoted to its dump/transport position as the spindle assembly 31 is advanced along the conveyor path by the conveyor means.

As the carriage rails place the spindle assembly 31 in the station notches **60*h* and 61*h* for the last fluid processing station (adjacent processing tank 114), the processor control unit 300 activates the fan 252 and heating element 256 in preparation for drying the spindle assembly 31 at the drying stations. Therefore, when the conveyor means advances to spindle assembly 31 to the first drying station, the air is preheated to quickly aid in drying film discs 30**.

The relative motions of the carriage rails 62 and 64, dryer hood 260 and spindle assemblies 31 are best shown in a comparison of FIGS. 6 and 7. Once the spindle assembly 31 is positioned at the first drying station (shown as spindle assembly **31*a*), a signal is sent from the processor control unit to the spindle spin motor 242 to activate that motor and cause the spindle assembly 31*a* to be rotated at the second higher rate of rotation for an initial part of the processing portion of the conveyor cycle. In one preferred embodiment, each conveyor cycle is approximately three minutes, 15 seconds in length, with the spindle assembly 31*a* being rotated at the second rate of rotation at the first drying station for the first thirty seconds of the processing portion of the cycle. After thirty seconds, a signal is sent from the processor control unit 300 to the spindle spin motor 242 to lower its speed so that the spindle assembly 31*a* is rotated at the first rate of rotation for the remainder of the processing portion of the cycle. When the processing portion of that cycle is completed, the conveyor motor 84 is again signaled by the processor control unit 300 to move the carriage rails through their closed circular paths to advance to spindle assembly 31*a*** along the conveyor path.

FIG. 7 shows the spindle assembly **31*a* at its highest position between the first drying station and the second drying station during the transport portion of the conveyor cycle. At the same time the spindle assembly 31*a* is being moved, the processor control unit 300 signals the spindle spin motor 242 to turn it off (unless another spindle assembly 31 is being advanced into the first drying station by the carriage rails 62 and 64). Once the spindle assembly 31*a* is in position at the second drying station (thus being designated as spindle assembly 31*b* in FIGS. 6 and 7), it is again rotated at the first rate of rotation by the spindle drive motor 196 through spindle drive shaft 192 and spindle drive gear 194. Tempered air is blown through the drying stations wall during the entire time a spindle assembly 31 is positioned at either drying station to facilitate drying of the film discs 30 thereon. Once the conveyor cycle is completed for the spindle assembly 31*b* at the second drying station, the processor control unit 300 signals the conveyor motor 84 to move the carriage rails 62 and 64 through their closed circular paths to engage the spindle assembly 31*b* and convey it to the exit ramps 246 and 248**, thus completing the processing cycle for that spindle assembly.

As described, once a spindle assembly 31 has been detected in the processor 20 by sensing switch 314, the various functions of the processor 20 are controlled by the processor control unit 300 as a function of the signal from the sensing switch 314. The processor control unit 300 activates the heating unit, motors, and valves in sequence to advance the spindle assembly 31 along the conveyor path and process the film discs 30 thereon. Processor control unit 300 keeps track of the location of each spindle assembly in processor 20. This is possible because microprocessor 302 monitors the status of the signal from sensing switch 314, and thus knows whether another spindle assembly 31 is entering the first processing station at the beginning of each conveyor cycle. If a number of spindle assemblies 31 are to be processed one after the other, the processor control unit 300 activates each component of the processor 20 in sequence depending on the position of the spindle assemblies 31 therein. For example, (1) processing fluid will only be dispensed by a valve (with the exception of the wash water valve 164) when a spindle assembly 31 is positioned at that valve's processing station, (2) the spindle spin motor 242 is only activated when a spindle assembly 31 is positioned at the first drying station, (3) the tank drive motor 180 is only activated after a spindle assembly 31 has been processed at one of the fluid processing stations, and (4) the fan 252 and heating element 256 are only activated when the spindle assembly 31 is about to enter or is at the drying stations. As a result, each spindle assembly 31 is properly processed, and yet processing fluids and energy are not wasted at processing stations where no spindle assembly 31 is present.

CONCLUSION

The present invention provides a processor for automatically processing photographic film discs mounted on a spindle assembly. The processor contacts the film discs with processing fluid in a preselected sequence and for preselected times and then dries the film discs, with the film discs being rotated to facilitate uniform fluid contacting and uniform drying. Processing tanks containing processing fluid are filled and dumped for each separate spindle assembly with film discs thereon, and a processing fluid tempering system maintains the processing fluid in the processing tanks at a desired temperature. A dryer hood is provided to prevent processing fluid residue from being cast into the rest of the processor from the spinning film discs during drying, and tempered air is blown under the hood past the film discs to facilitate their drying. Once a spindle assembly has been detected in the processor, a processor control unit automatically advances that spindle assembly through the processor, controlling the various functional components of the processor to properly and sequentially develop the photographic images on the film discs.

Although the present invention has been described with reference to preferred embodiments, workers skilled in the art will recognize that changes may be made in form and detail without departing from the spirit and scope of the invention.

What is claimed is:

1. A processor for processing undeveloped photographic film discs mounted on a spindle assembly, the processor comprising:

spindle sensing means for providing a spindle present signal indicative of the presence of the spindle assembly at a first end of the processor;

conveyor means for conveying the spindle assembly from the first end of the processor intermittently along a generally horizontal conveyor path to each of a plurality of processing stations, the conveyor means conveying the spindle assembly so that the spindle assembly has an axial direction which is generally horizontal and perpendicular to the conveyor path wherein the intermittent conveying of the spindle assembly by the conveyor means is cyclical with each conveyor cycle of the conveyor means having a transport portion and a processing portion;

processing tanks at selected processing stations for containing processing fluid;

tank drive means for moving the processing tanks between an upward process position and a downward dump position;

fluid dispensing means at selected processing stations for dispensing processing fluid into the processing tank at that processing station; and control means responsive to the spindle sensing means for controlling operation of the conveyor means, the tank drive means and the fluid dispensing means as a function of the location of the spindle assembly within the processor.

2. The processor of claim 1, and further comprising:

spindle drive means for rotating the spindle assembly when the spindle assembly is positioned at the processing stations to cause the film discs mounted on the spindle assembly to be rotated, and the spindle drive means being controlled by the control means as a function of the location of the spindle assembly.

3. The processor of claim 2 wherein the spindle assembly is conveyed by the conveyor means from the processing stations to first and second drying stations and wherein the spindle drive means rotates the spindle assembly at a first rate of rotation when the spindle assembly is positioned at the second drying station, and further comprising:

spindle spin means at the first drying station for rotating the spindle assembly and film discs mounted thereon at a second higher rate of rotation to dry the film discs by centrifugal force, and the spindle spin means being controlled by the control means as a function of the location of the spindle assembly.

4. The processor of claim 3 wherein the control means causes the spindle spin means to rotate the spindle assembly at the second rate of rotation for an initial part of the processing portion and at the first rate of rotation for a remaining part of the processing portion.

5. The processor of claim 3 wherein the control means actuates the spindle spin means when the spindle assembly is positioned at the first drying station.

6. The processor of claim 3, and further comprising:

blower means for blowing tempered air through the drying stations to facilitate film disc drying, and the blower means being controlled by the control means as a function of the location of the spindle assembly.

7. The processor of claim 6, and further comprising:

heating means for tempering the air blown by the blower means, the heating means being controlled by the control means as a function of the location of the spindle assembly.

8. The processor of claim 7 wherein the control means actuates the heating means when the spindle assembly is positioned at a selected processing station adjacent the first drying station and at the first and second drying stations.

9. The processor of claim 6 wherein the blower means is not actuated unless the spindle assembly is positioned at a selected processing station adjacent the first drying station and at the first and second drying stations.

10. The processor of claim 1 wherein the control means controls the fluid dispensing means so that processing fluid is dispensed from the fluid dispensing means into its respective processing tank only when the spindle assembly is positioned at that processing tank's processing station.

11. The processor of claim 1 wherein at the beginning of each conveyor cycle the tank drive means moves the processing tanks to the downward dump position to permit the conveyor means to advance the spindle assembly from one processing station to a next processing station during the transport portion of the cycle, and wherein thereafter during the cycle the tank drive means moves the processing tanks into the upward process position to place a portion of the film discs mounted on the spindle assembly within one of the processing tanks when the spindle assembly is positioned at that processing tank's processing station during the processing portion of the cycle.

12. The processor of claim 1 wherein the control means determines whether a spindle assembly is present at the first end of the processor at the beginning of each conveyor cycle based upon the spindle present signal and maintains control information representative of location of each spindle assembly within the processor, and wherein the control means controls operation of the conveyor means, the tank drive means and the fluid dispensing means during each cycle as a function of the control information.

* * * * *